Figure 1:
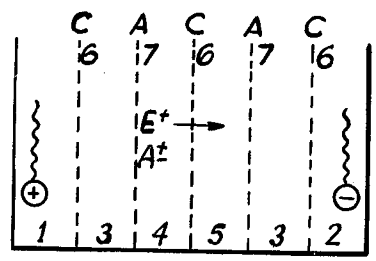

United States Patent [19]

Perry et al.

[11] 4,238,307

[45] * Dec. 9, 1980

[54] ELECTRODIALYSIS PROCESS FOR THE SEPARATION OF ESSENTIAL AMINO ACIDS FROM DERIVATIVES THEREOF

[75] Inventors: Mordechai Perry, Petach Tikvah; Ora Kedem, Rehovot, both of Israel

[73] Assignee: Research Products Rehovot Ltd., Rehovot, Israel

[ * ] Notice: The portion of the term of this patent subsequent to Dec. 9, 1997, has been disclaimed.

[21] Appl. No.: 12,213

[22] Filed: Feb. 14, 1979

[51] Int. Cl.[3] .............................................. B01D 13/02

[52] U.S. Cl. .................................. 204/180 P; 204/301

[58] Field of Search ...................... 204/180 P, 299, 301

[56] References Cited

U.S. PATENT DOCUMENTS

| | | | |
|---|---|---|---|
| 3,051,640 | 8/1962 | Traxler | 204/180 P |
| 3,330,749 | 2/1967 | Kuwata et al. | 204/180 P |
| 3,972,791 | 8/1976 | Stern | 204/180 P |

*Primary Examiner*—Arthur C. Prescott

[57] ABSTRACT

The invention provides a process for the separation, by electrodialysis, of a mixed aqueous solution, containing an essential amino acid and a derivative of that acid as components therof, wherein one of said components is in charged form and the other of said components is in amphoteric form, into at least two separate product solutions, of acid and derivative respectively, of which at least one product solution contains highly pure product obtained at high quantitative yield, comprising providing an electrodialysis stack, continuously introducing a feed solution containing an essential amino acid and derivative thereof to be separated into feed cells of the stack, adjusting the flow rate and concentration of the solution and the electric current density applied to values adapted to create concentration polarization conditions adjacent to the membranes in the feed cell thereby accumulating a high local concentration of protons upon the surface of the anion exchange membranes, and a high local concentration of hydroxyl ions upon the cation exchange membranes and maintaining the pH of the bulk solution in the feed cells in a range of between 4-8, irrespective of the isoelectric point of the amphoteric component, in order to adjust for pH changes of the bulk solution occurring due to unequal rates of water dissociation at the cation and anion exchange membranes.

12 Claims, 2 Drawing Figures

ELECTRODIALYSIS PROCESS FOR THE SEPARATION OF ESSENTIAL AMINO ACIDS FROM DERIVATIVES THEREOF

The present invention relates to an improved process for the separation of essential amino acids from derivatives thereof. More particularly the present invention relates to a process for the separation between essential amino acids and their derivatives by electrodialysis, especially as a step in the resolution between optical stereoisomers of the amino acids obtained from stereospecific enzymatic hydrolysis wherein high purity of each of the separated species and high quantitative yield are required.

As is known essential amino acids are those amino acids which are essential for animal and human nutrition and the term essential amino acids as used herein is directed to such acids. Examples of such amino acids include Lysine, Tryptophane, Histidine, Phenylalanine, Leucine, Isoleucine, Threonine, Methionine, Valine and Arginine.

The application of electrodialysis for purifying and resolving aqueous solutions of amino acids is known in the art and various processes utilizing electrodialysis for said purpose are described in U.S. Pat. Nos. 3,051,640; 3,231,485; 3,459,650; 3,330,749; and 3,398,078 and in Israel Pat. No. 16,270.

Thus, while the application of electrodialysis for purifying and resolving aqueous solutions of amino acids, is therefor in itself not new, the processes represented in said patents can be classified into 3 different groups:

1. Separation between a mixture of different amino acids obtained from protein hydrolysates.
2. Removal of inorganic salts from a solution of amino acid.
3. Purification of amino acids of inorganic and organic odorous and colored impurities.

It will be noted from said prior art patents that heretofor, in light of the fact that at the isoelectric point of an amino acid there exists the highest concentration of the amino acid in non-ionic form, attempts were made to adjust the pH to the specific isoelectric point to reduce the concentration of other ionic forms of the amino acid and thereby to reduce the losses caused by the migration of said ions through the ion exchange membranes. Thus the above-mentioned patents which describe the adjustment of pH in the feed compartment as part of the process described and/or claimed are based on the neuralization of the charge of amino acid by adjusting the pH of the bulk solution as closely as possible to the exact isoelectric pH of the acid required to be retained in the feed cell. It has been found however, that the desalination of amino acid solutions by this method causes a significant loss of the acid, up to 20%, unless special pH trap compartments or other means are introduced into the design of the ED stack (Israeli patent No. 16,270).

In the prior art processes the loss of the amino acid occurs via two different mechanisms:

a. A diffusion of the zwitterionic (non charged) form of the amino acid through the membranes; and
b. An electromigration of the charged forms of the amino acid existing in equilibrium with the zwitterionic form. Since considerable concentrations of these charged forms can be found in the feed compartment even when the amino acid is kept at its isoelectric pH said charged forms are free to migrate through the membranes thereby contributing to said losses The removal of organic impurities can lead to relatively pure amino acid, but also, in this case to the loss of acid along with the impurities and thus this latter method is applicable only in situations in which the impurities exist only in trace concentrations.

In contradistinction to the above processes the separation of amino acids from their derivatives and inorganic salts according to the present invention is endowed with an important improvement: highly pure products can be separated at a high yield from a mixture containing a large excess of inorganic and organic solutes.

In the present invention the separation of the amino acid from, e.g., an ester derivative thereof, is based on the amphoteric properties of the amino acid or the amphoteric properties of derivatives of a charged amino acid such as Lysine, Histidine and Arginine.

More specifically the separation is based on the fact that the charge of the amphoteric component of a mixture, containing an essential amino acid and a derivative of that acid as components thereof wherein one of said components is in charged form and the other of said components is in amphoteric form, can be changed from positive to negative by changing the pH of the solution below or above the isoelectric point of the amphoteric component Operating the electrodialysis system at high current densities, close to the value of the limiting current density, i.e., the current density at which significant dissociation of water occurs upon the electrodialysis membranes resulting in local pH changes along the surfaces of said membranes, causes significant local pH changes near the membranes, due to the transport of $H^+$ and $OH^-$ through the cation and anion exchange membranes. In this manner concentration polarization conditions are created by adjusting the electric current density close to the value of limiting current density for the flow rate applied and solute concentration used and water dissociation near the membranes creates a pH barrier on the membranes which does not allow the amphoteric component to pass therethrough.

These pH barriers can be utilized in order to achieve sharp separation between, e.g., amphoteric essential amino-acids and their charged derivatives, or other ions, by the following mechanism: near a cation exchange membrane, through which protons are removed, the pH rises, and the amino acid becomes negatively charged. It is attracted by the electric field towards the anion exchange membrane, where it becomes positively charged, and is repelled again towards the cation exchange membrane. On the other hand, charged derivatives of the amino acid are removed by the electric field. The polarization, which is usually a nuisance, thus enhances separation.

Inorganic salts which are present are removed out of the feed compartment simultaneously with the ester, whereby the ester passes through the cation exchange membrane together with the cations of the salt, while anions of the salt are transported through the anion exchange membrane, leaving the amino acid free of both the ester and the inorganic electrolytes.

Too high or too low pH in the bulk solution or near the membranes may be detrimental, causing decomposition of some unstable derivatives of the amino acids (esters). Moreover, at such extreme pH values, the pH barriers established upon the membrane surfaces, which are responsible for the retention of the amino acids, may become neutralized, thus reducing the yield of the acid recovery. It is therefor important to keep the pH of the bulk close to the neutral value, irrespective of the value of the isoelectric pH of, e.g., the amino acid or the amphoteric derivative in the case of a charged amino acid.

The limiting conditions, where the above mentioned dissociation of water occurs, are very well defined in the literature, and can be controlled through current density and flow hydrodynamics in an Electrodialysis stack. The pH of the bulk can be controlled within the required limits by adding continuously base or acid to the desalted compartment.

Thus, according to the present invention there is now provided a process for the separation, by electrodialysis, of a mixed aqueous solution, containing an essential amino acid and a derivative of that acid as components thereof, wherein one of said components is in charged form and the other of said components is in amphoteric form, into at least two separate product solutions of acid and derivative respectively, of which at least one solution contains highly pure product obtained at high quantitative yield, comprising:

(a) providing an electrodialysis stack, preferably made of a series of thin compartments separated alternatively by cation and anion exchange membranes which are located between a single pair of electrodes;
(b) continuously introducing a feed solution containing an essential amino acid and derivative thereof to be separated into feed cells of said stack;
(c) adjusting the flow rate and concentration of said solution and the electric current density applied to values adapted to create concentration polarization conditions adjacent to the membranes in the feed cells, thereby accumulating a high local concentration of protons upon the surface of the anion exchange membranes, and a high local concentration of hydroxyl ions upon the cation exchange membranes; and
(d) maintaining the pH of the bulk solution in the feed cells in a range of between 4–8, irrespective of the isoelectric point of said amphoteric component, in order to adjust for pH changes of the bulk solution occurring due to unequal rates of water dissociation at the cation and anion exchange membranes.

Preferably the pH of the bulk solution in the feed cell will be maintained within the desired range by introducing small amounts of acid or base and especially preferred is a pH range of between about 5 and 7.

The process according to the present invention is useful for the separation of amino acids from ester or acyl derivatives thereof as exemplified hereinafter and can preferably be used when the amino acids and the derivative are different stereoisomers whereby, e.g., an L-amino acid can be separated from a D-derivative thereof and vice versa.

Figure 2:
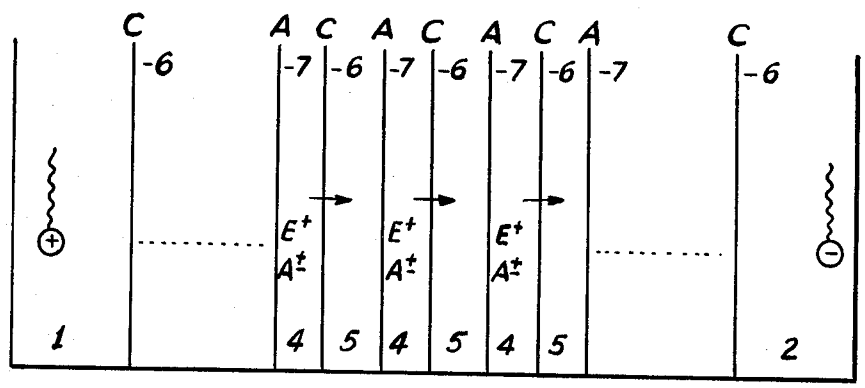

In order that the invention may be understood more fully reference should be had to the following illustrative description and examples read in conjunction with the accompanying figures, in which:

FIG. 1 is a schematic illustration of a six compartment electrodialysis cell used in carrying out the process of the present invention; and FIG. 2 is a schematic illustration of a multi compartment electrodialysis stack used for carrying out the process of the present invention.

Referring now to FIG. 1 there is schematically illustrated an electrodialysis cell used for the separations described in examples 1 and 2 hereinafter composed of six compartments wherein compartments 1+2 are electrode compartments filled with 0.1 M NaCl; compartments 3 are intermediate compartments filled with 0.01 M buffer pH 7.5 to eliminate the solution loss from the anode and cathode compartments; compartment 4 is the feed cell containing the feed solution containing an amino acid ($A\pm$) and its ester ($E^+$) and compartment 5 is the permeate cell containing permeate solution containing a transported ester which compartments are separated by cation 6 and anion 7 exchange membranes.

While the invention will now be described in connection with certain preferred embodiments in the following examples and with reference to the Figures it will be understood that it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of procedures as well as of the principles and conceptual aspects of the invention.

EXAMPLES

EXAMPLE 1

Separation of L-Tryptophane from L-Tryptophane Methyl Ester (A) The feed solution included 10 mM of each: phosphate buffer (pH=7), ester and acid. Electric current of 5 $mA/cm^2$ was applied through the electrodialysis cell of FIG. 1 and the feed solution was circulated with a linear flow velocity of about 1 cm/sec. During the first 15 minutes no change in the concentration of the acid and of the ester could be detected, while the concentration of the buffer in the feed compartment 4 was reduced below 1 mM. After this stage, a complete transfer of the ester from the feed compartment 4 into the permeate compartment 5 was accomplished within an additional 15 minutes, leaving 99.5% pure amino acid in the feed compartment. Less than 5% of the acid was lost.

(B) The separation between L-tryptophane and L-Tryptophane methyl ester was repeated in the same cell, described in Example 1, this time without adding a buffer to the feed solution. The feed compartment contained a solution of 5 mM tryptophane and 0.5 mM tryptophane methyl ester at a pH of 5.7±0.5. Complete removal of the ester from the acid was obtained with an acid purity of 99.8%. No acid was detected in the receiving (permeate) compartment 5. The electric resistance of the system increased gradually during the experiment followed by a reduction of current efficiency and a decrease of the current density from the initial value of 2.5 $mA/cm^2$ to about 0.2 $mA/cm^2$ at the end of the experiment.

EXAMPLE 2

Separation of L-tryptphane from D-tryptophane methyl ester

The separation and isolation of L-tryptophane from D-tryptophane methyl ester was achieved in the following way:

A DL-Tryptophane methyl ester (10 mM) in 0.02 M phosphate buffer, pH 7.5, was pressed through a column of chymotrypsinsephadex particles. The permeate contained a mixture of L-tryptophane (5 mM) obtained by stereo-specific enzymatic hydrolysis, and D-tryptophane methyl ester (5 mM) and 20 mM phosphate buffer, pH 7.0. This mixture was separated in an electrodialysis cell as described in Example 1. Electric current of 5 $mA/cm^2$ was applied through the electrodialysis cell in which the feed solution was circulated with a linear flow velocity of about 5 cm/sec. At the end of the experiment, the acid in the feed compartment was tested for chemical and optical purity. It was found to be 98.5% pure L-tryptophane.

Referring now briefly to FIG. 2 which schematically illustrates a multicompartment electrodialysis cell used in the remaining examples and in which like numerals have been used to indicate like parts as in FIG. 1, said cell comprises an anode compartment 1 and cathode compartment 2 and a plurality of repeating alternating feed compartments 4 and permeate compartments 5 separated by cation exchange membranes 6 and anion exchange membrane 7.

EXAMPLE 3

The separation between L-tryptophane from L-tryptophane methyl ester was performed in the electrodialysis stack schematically illustrated in FIG. 2. Feed solution of 500 ml, having ~5 mM of tryptophane, ~0.5 mM of tryptophane methyl ester and 3 mM phosphate buffer at pH 6.5, was circulated through the ED stack for about 2 hours, with an applied current density of 10 $mA/cm^2$. The linear velocity of the circulating feed was kept at 10 cm/sec. After this time, the feed and permeate solutions were analyzed and the following results were found:

Ester concentration decreased from 0.42 mM to 0.02 mM.

Acid concentration decreased from 4.88 mM to 4.50 mM, i.e. about 7.8% of acid loss.

No inorganic salts were found in the feed compartment at the end of the experiment.

The chemical purity of tryptophane was 99.6%.

The electric current density reduced from the initial value of 10 $mA/cm^2$ to about 0.5 $mA/cm^2$ at a constant voltage drop of 50 volts.

EXAMPLE 4

Separation of L-Methionine from N-Acetyl-D-Methionine

In an electrodialysis stack as in FIG. 2 each of the feed compartments included: 5 mM of L-methionine and 5 mM of N-Acetyl-D-Methionine at pH ~6.5. The removal of the negatively charged N-Acetyl-D-Methionine into the permeate compartments through the anionic membranes was monitored by determining the concentration of the amino acid by means of ninhydrin reaction within small samples withdrawn out of the feed and permeate vessels.

Following the operating conditions of example 2, the near complete removal of N-Acetyl-D-Methionine was performed at 100% current efficiency. The chemical purity of the acid was 99.8%; a loss of 4.5% of the acid was detected.

EXAMPLE 5

Separation between L-Histidine and D(α)-N-acetyl Histidine

The separation in the ED stack was performed by filling the feed compartment with 10 mM L-Histidine, 10 mM D(α)N acetyl Histidine, and 10 mM phosphate buffer at pH 6.0. The pH was kept in the range of 5.0–6.0 by titrating the feed solution with NaOH (0.5 M). This value is higher than the isoelectric pH of the (α)DN acetyl Histidine ($pH_{iso}=3.91$).

Applying electric current density of 10 $mA/cm^2$, and circulating the feed at a linear flow velocity of 10 cm/sec. the positively charged amino acid was transported from the feed compartments into the permeate compartments through the cation exchange membranes, while the amphoteric D(α)N acetyl Histidine was retained in the feed compartments. For a complete removal of L-histidine from the feed compartments less than 5% loss of the N-acetyl Histidine was detected. The optical purity of the N-Acetyl Histidine was found to be >95%.

COMPARATIVE EXAMPLE 6

The separation described in Example 5 was repeated, this time controlling the pH of the feed solution close to the isoelectric point of D(α)-N-Acetyl Histidine, i.e., 3.9. Current density of 10 $mA/cm^2$ was applied and the linear velocity in the stack was increased to 10 cm/sec. The analysis of the permeate solution revealed that about 30% of D(α) N-acetyl Histidine was lost from the feed solution.

While particular embodiments of this invention have been described it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for the separation, by electrodialysis of a mixed aqueous solution, containing an essential amino acid and a derivative of that acid as components thereof, wherein one of said components is in charged form and the other of said components is in amphoteric form, into at least two separate product solutions, of acid and derivative respectively, of which at least one product solution contains highly pure product obtained at high quantitative yield, comprising:

(a) providing an electrodialysis stack;

(b) continuously introducing a feed solution containing an essential amino acid and derivative thereof to be separated into feed cells of said stack; and (c) adjusting the flow rate and concentration of said solution and the electric current density applied to values adapted to create concentration polarization conditions adjacent to the membranes in the feed cell thereby accumulating a high local concentration of protons upon the surface of the anion exchange membranes, and a high local concentration of hydroxyl ions upon the cation exchange membranes; and (d) maintaining the pH of the bulk solution in the feed cells in a range of between 4–8, irrespective of the isoelectric point of said amphoteric component, in order to adjust the pH changes of the bulk solution occurring due to unequal rates of water dissociation at the cation and anion exchange membranes.

2. A process according to claim 1 for separating an essential amino acid from a derivative of that acid in ionic form.

3. A process according to claim 1 wherein said stack is made of a series of thin compartments separated alternatively by cation and anion exchange membranes which are located between a single pair of electrodes.

4. A process according to claim 1 wherein the pH of the bulk solution in the feed cell is adjusted by introducing small amounts of acid thereto.

5. A process according to claim 1 wherein the pH of the bulk solution in the feed cell is adjusted by introducing small amounts of base thereto.

6. A process according to claim 1 wherein the pH of the bulk solution in the feed cell is adjusted and maintained in a range of between 5 and 7.

7. A process according to claim 1 wherein the mixture to be separated is obtained by an L- or D-specific enzymatic hydrolysis of a DL-amino acid derivative.

8. A process according to claim 1 wherein the mixture to be separated is obtained as a result of immobilized enzyme hydrolysis.

9. A process according to claim 1 for the production of optically pure essential amino acids by the separation of a mixed aqueous solution containing an essential L-amino acid and a D-derivative thereof.

10. A process according to claim 1 for the production of optically pure essential amino acids by the separation of a mixed aqueous solution containing an essential D-amino acid and an L-derivative thereof.

11. A process according to claim 1 for the separation of amino acids from ester or acyl derivatives thereof.

12. Purified essential amino acid obtained by the process of claim 1, wherein the purity of the separated acid is in the range of between 80–100%, and the yield is higher than 90%.

* * * * *